«12» United States Patent
Lee

(10) Patent No.: US 8,535,778 B2
(45) Date of Patent: Sep. 17, 2013

(54) MASKING FILM AND METHOD FOR MANUFACTURING THEREOF

(76) Inventor: Cheol Lee, Wonju-si (KR)

(*) Notice: Subject to any disclaimer, the term of this patent is extended or adjusted under 35 U.S.C. 154(b) by 1114 days.

(21) Appl. No.: 12/122,081

(22) Filed: May 16, 2008

(65) Prior Publication Data

US 2009/0202771 A1 Aug. 13, 2009

(30) Foreign Application Priority Data

Feb. 13, 2008 (KR) .................. 10-2008-0012956

(51) Int. Cl.
*B32B 7/10* (2006.01)
(52) U.S. Cl.
USPC .............................. 428/121; 428/98; 428/122
(58) Field of Classification Search
USPC ............................................ 428/121, 122, 98
See application file for complete search history.

(56) References Cited

U.S. PATENT DOCUMENTS 3,892,900 A * 7/1975 Shima et al. ................. 428/40.8
6,124,018 A * 9/2000 Yoshino ........................ 428/122

* cited by examiner

*Primary Examiner* — Brent O'Hern
(74) *Attorney, Agent, or Firm* — Edwards Wildman Palmer LLP

(57) ABSTRACT

A masking film is provided to protect an area that should not be painted. A method for manufacturing the masking film requires extrusion-molding a film sheet in a tube shape; compressing the tube to create a twofold film sheet; folding the twofold film sheet in half by a first center line, to form a fourfold film sheet; folding the fourfold film sheet in half by a second center line, to form an eightfold film sheet; slitting an outermost film along a virtual slitting line positioned at a predetermined width inward from a folding line to form a plurality of leaves; and winding the film sheet about a bobbin with a slitting line slit positioned inwardly.

4 Claims, 4 Drawing Sheets

MASKING FILM AND METHOD FOR MANUFACTURING THEREOF

CROSS-REFERENCE TO RELATED APPLICATION

This application claims the benefit of Korean Patent Application No. 10-2008-0012956, filed Feb. 13, 2008, the disclosure of which is hereby incorporated herein by reference in its entirety.

BACKGROUND OF THE INVENTION

1. Technical Field

The present invention relates to a masking film and a method for manufacturing the same that is applied to the boundary line between an area to be painted and an area not to be painted, to protect the area that should not be painted from being unintentionally painted when painting portions of buildings, roads, vehicles, various goods and others and, more particularly, to a masking film and a method for manufacturing the same that slit an outermost film of a film sheet folded into a plurality of leaves, along a virtual slitting line positioned inward by a predetermined width from a folding line forming an outer line of the film sheet, and wind the film sheet about a bobbin in the manner that a slitting line slit by a slitter to be positioned inwardly.

2. Discussion of Related Art

Korean Patent Laid-Open Publication No. 10-2002-0059005 (laid-open on Jul. 12, 2002) discloses a "method for manufacturing a masking tape".

The above conventional method for manufacturing a masking tape comprises the steps of: preparing a long fabric film sheet being rolled in a cylindrical shape; compressing the cylindrical fabric film sheet; performing electro-discharge processing of the entire outer surface of the compressed film sheet; folding the electro-discharged film sheet in one direction in the manner that a lower part of the film sheet is folded over toward an upper part of the film sheet in the lengthwise direction, leaving a predetermined width downwardly from an edge of the upper part of the film sheet; slitting the film sheet positioned at a top surface of a predetermined unfolded portion within the predetermined width in the lengthwise direction; unfolding an upper part of the film sheet being slit and continuously attaching a part of an adhesive tape to a predetermined portion of the upper part of the film sheet being slit in one direction while leaving the other part of the adhesive tape to attach an object to be painted; and winding the film sheet around a cylindrical core while attaching the adhesive tape to the film sheet.

However, in the aforementioned conventional method, a method for slitting the film sheet is not specifically described and the adhesive tape is attached to the inside of the slit upper part of the film sheet.

SUMMARY OF THE INVENTION

Therefore, the present invention is directed to provide a masking film and a method for manufacturing the same, wherein an outermost film of a film sheet folded into a plurality of leaves is slit along a virtual slitting line positioned inward by a predetermined width from a folding line forming an outer line of the film sheet and the film sheet is wound about a bobbin in the manner that a slitting line slit by a slitter is positioned inwardly, so that a portion of the film sheet being unfolded to cover an area not to be painted is prevented from being unintentionally adhered to an adhesive tape when the adhesive tape is applied to the opposite side of a slit piece by a dispenser.

Another object of the present invention is to provide a masking film and a method for manufacturing the same, wherein an outermost film of a film sheet folded into a plurality of leaves is slit along a virtual slitting line positioned inward by a predetermined width from a folding line forming an outer line of the film sheet, a junction part being slit is unfolded by a support plate of a ladder shape, an oriented polypropylene (OPP) film is applied to the unfolded junction part and then the junction part is stably wound about a bobbin in a height same as the film sheet by the OPP film, so that the junction part is not pressed to prevent an adhesive tape from being deviated from the OPP film and being unintentionally adhered when the adhesive tape is applied to the OPP film by using a dispenser.

Exemplary embodiments of the present invention provide a masking film and a method for manufacturing the same.

In accordance with an exemplary embodiment, the present invention provides a method for manufacturing a masking film, comprising the steps of: extrusion-molding a film sheet in a tube shape; folding the twofold film sheet in half by a first center line, resulting the fourfold film sheet; folding the fourfold film sheet in half by a second center line, resulting the eightfold film sheet; slitting an outermost film along a virtual slitting line positioned by a predetermined width inward from a folding line which is an outer line of the film sheet folded into a plurality of leaves; and winding the film sheet about a bobbin in the manner that a slitting line slit by a slitter is positioned inwardly.

The step of slitting the outermost film, along the slitting line is characterized in that only the outermost film of the film sheet folded into a plurality of leaves is slit by the slitter along the virtual slitting line while passing through between the slitter and a support plate.

A masking film manufactured by the above-described method is characterized in that a film sheet is extrusion-molded in a tube shape and is folded into a plurality of leaves, and a slit piece is formed as an outermost film is slit along a virtual slitting line positioned by a predetermined width inward from a folding line formed when the film sheet is lastly folded, wherein the film sheet is wound about a bobbin in the manner that the slit piece is positioned inwardly.

The width is within the range of 9 to 20 mm. If the width is less than 9 mm, the slit piece is likely to be unfolded and adhered to an adhesive tape when attaching the adhesive tape. If the width is more than 20 mm, the materials may be wasted.

In accordance with another exemplary embodiment, the present invention provides a method for manufacturing a masking film, comprising the steps of: extrusion-molding a film sheet in a tube shape; folding the twofold film sheet in half by a first center line, resulting the fourfold film sheets; folding the fourfold film sheet in half by a second center line, resulting the eightfold film sheet; slitting an outermost film along a virtual slitting line positioned by a predetermined width inward from a folding line which is lastly formed when the film sheet is folded into a plurality of leaves; allowing only the outermost film of the film sheet folded into the plurality of leaves to pass through between a slitter and a support plate of a ladder shape to be simultaneously slit by the slitter along the virtual slitting line (115); unfolding a slit junction part by the support plate of a ladder shape while passing through the support plate; attaching an OPP film to the unfolded junction part so as to be correspondent with the width of the junction part; and winding the film sheet to which the OPP film is attached about a bobbin.

A masking film manufactured by the above-described method is characterized in that an outermost film of a film sheet folded into a plurality of leaves is slit by a slitter along a virtual slitting line positioned by a predetermined width inward from a folding line lastly formed when the film sheet is folded into the plurality of leaves, a junction part being slit is unfolded by a support plate of a ladder shape, an OPP film is attached to the unfolded junction part, and the film sheet is wound about a bobbin.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

The present invention will now be described more fully hereinafter with reference to the accompanying drawings, in which preferred embodiments of the invention are shown.

A method for manufacturing a masking film according to a first exemplary embodiment of the present invention will be described with reference to FIGS. 1A through 1D.

Figure 1A:
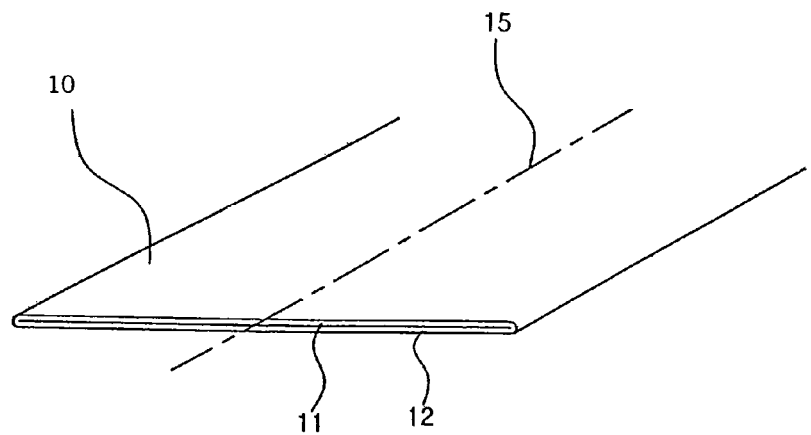
FIGS. 1A through 1D are flow views illustrating a method for manufacturing a masking film according to a first exemplary embodiment of the present invention.

In FIG. 1A, in step S101, a film sheet 10 is extrusion-molded into a tube shape. The extrusion-molded film sheet 10 is compressed using a compression roller (not shown), to form the twofold film sheet 10 consisting of an upper film 11 and a lower film 12.

Figure 1B:
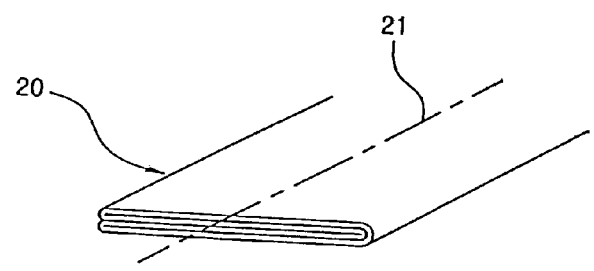

Subsequently, in step S102, the twofold film sheet 10 is folded in half by a first center line 15 illustrated in FIG. 1A, to form a fourfold film sheet 20 as illustrated in FIG. 1B.

Figure 1C:
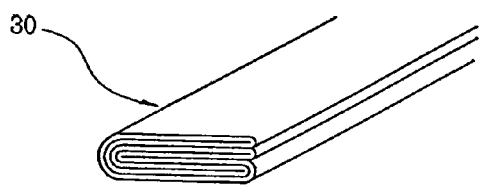

Subsequently, in step S103, the fourfold film sheet 20 is folded in half by a second center line 21 illustrated in FIG. 1B, to form an eightfold film sheet 30 as illustrated in FIG. 1C.

Figure 1D:
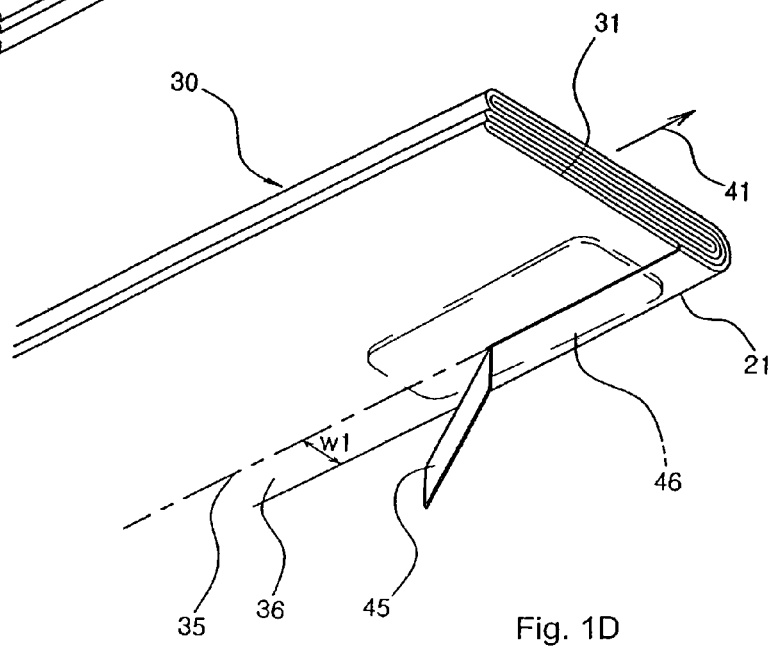

Subsequently, in step S104, an outermost film 31 of the film sheet 30 is slit along a virtual slitting line 35 positioned by a predetermined width W1 inward from a folding line 21 forming an outer line of the film sheet 30 folded in a plurality of leaves in the above manner, as illustrated in FIG. 1D.

The width W1 is 9 to 20 mm. When the width W1 is less than 9 mm, a slit piece 36 is likely to be unfolded and adhered to the adhesive tape when attaching an adhesive tape. When the width W1 is more than 20 mm, the materials may be wasted.

When the film sheet 30 is moved by a drawing roller in a direction of an arrow 41, only the outermost film 31 of the eightfold film sheet 30 is slit by the slitter 45 along the virtual slitting line 35 while passing through between a slitter 45 and a support plate 46.

Figure 2:
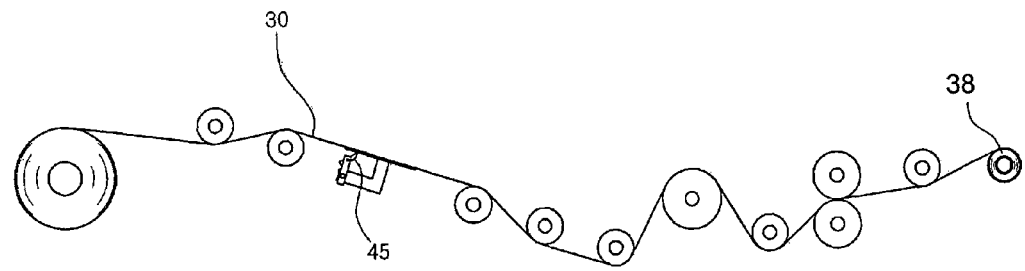
FIG. 2 is a schematic view of a winding apparatus to realize the method for manufacturing a masking film according to the first exemplary embodiment.

In step S105, as illustrated in FIG. 1D and FIG. 2, the film sheet 30 is wound about a bobbin 38 in the manner that the slitting line 35 slit by the slitter 45 is positioned inwardly, thereby completing the manufacturing of a masking film.

In a masking film according to a first exemplary embodiment of the present invention, which is manufactured by the method according the first exemplary embodiment of the present invention, a film sheet is extrusion-molded in a tube shape and is folded into a plurality of leaves, a slit piece 36 is formed as an outermost film 31 is slit, along a virtual slitting line 35 positioned by a predetermined width W1 inward from a folding line 21 formed when the film sheet is lastly folded, and the film sheet is wound about a bobbin 38 in the manner that the slit piece 36 is positioned inwardly.

Figure 3:
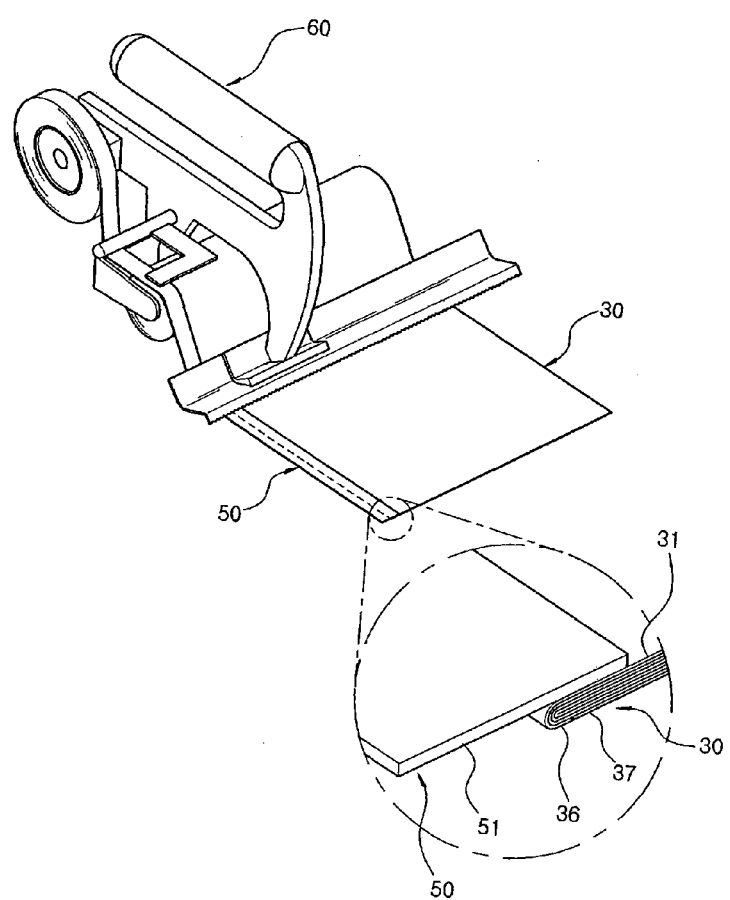
FIG. 3 is a perspective view and partially enlarged view illustrating an example that an adhesive tape is attached to a masking film manufactured by the method according to the first exemplary embodiment, using a dispenser.

With reference to FIG. 3, in the masking film according to the first exemplary embodiment of the present invention, a part of an adhesive tape 50 is attached to the opposite side to the slit piece 36 by a dispenser 60, an unattached part 51 of the adhesive tape 50 is attached to the boundary line between an area to be painted and an area not to be painted by paint (not shown). Accordingly, when a worker unfolds the masking film by holding the opposite side to the slit piece 36, the masking film is broadly unfolded to cover the area not to be painted by the paint.

When the worker applies the adhesive tape 50 to the opposite side to the slit piece 36 by using the dispenser 60 at a work field, an unfolded part 37 of the masking film according to the first exemplary embodiment of the present invention to cover the area not to be painted does not have a risk to unintentionally adhere to the adhesive tape 50.

Figure 4A:
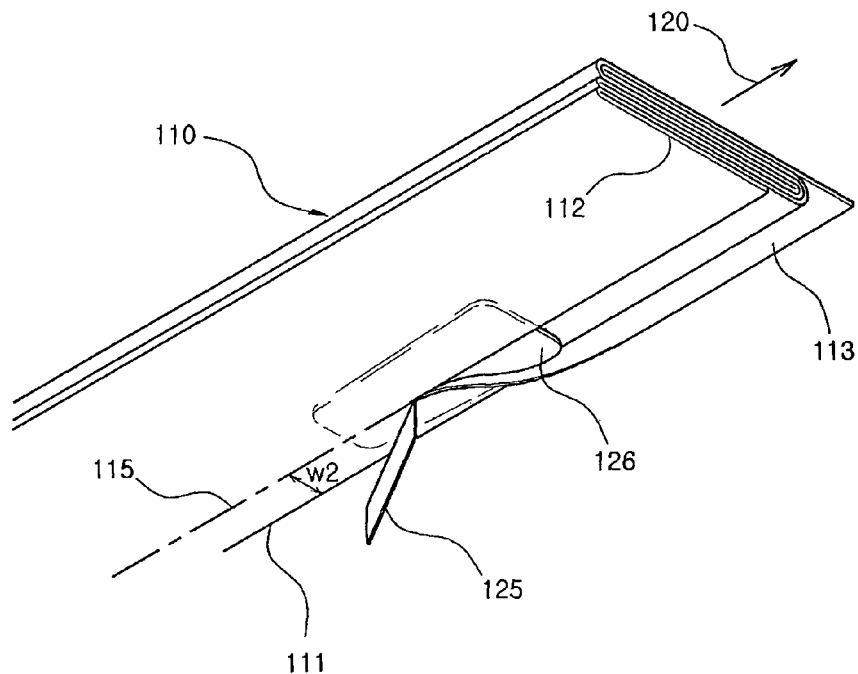
FIGS. 4A and 4B are flow views illustrating a method for manufacturing a masking film according to a second exemplary embodiment of the present invention.
Figure 4B:
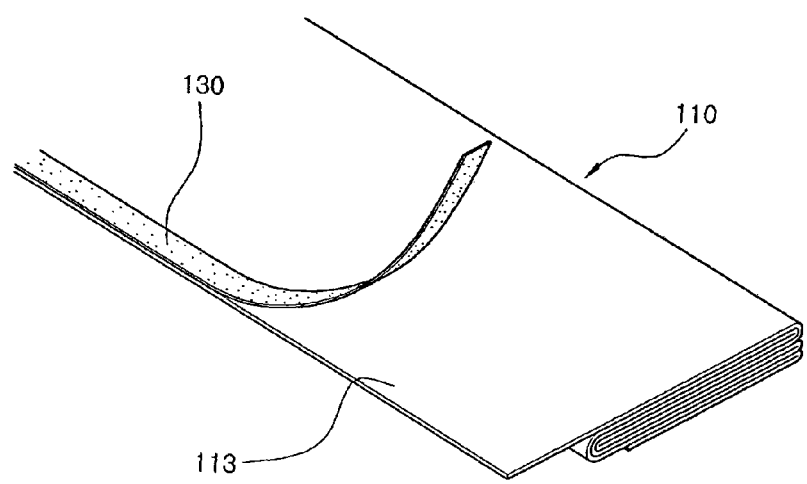

FIGS. 4A and 4B illustrate a method for manufacturing a masking film according to a second exemplary embodiment of the present invention. In this method according to the second exemplary embodiment, a film sheet is folded into a plurality of leaves in a tube shape by the same process as described with reference to FIGS. 1A through 1C regarding the method for manufacturing a masking film according to the first exemplary embodiment.

In step S204, an outermost film 112 is slit along a virtual slitting line 115 positioned by a predetermined width W2 inward from a folding line 111 formed when the film sheet is lastly folded into a plurality of leaves.

Figure 5:
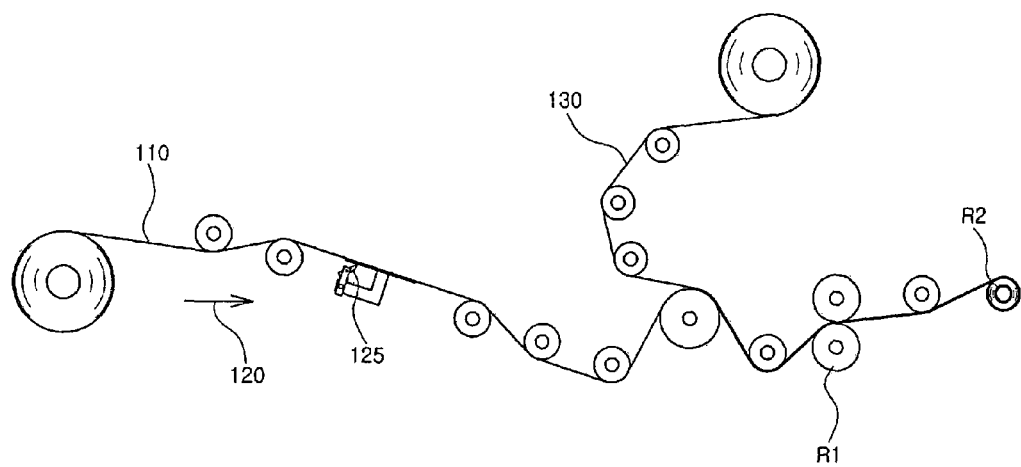
FIG. 5 is a schematic view of a winding apparatus to realize the method for manufacturing a masking film according to the second exemplary embodiment.

In step S205, when the film sheet 110 is moved in a direction of an arrow 120 by a drawing roller R1 as illustrated in FIG. 5, only the outermost film 112 of the film sheet 110 folded into the plurality of leaves is slit by the slitter 125 along the virtual slitting line 115 while passing through between a slitter 125 and a support plate 126 as illustrated in FIG. 4A.

Subsequently, in step S206, a junction part 113 is unfolded by a support plate 126 of a ladder shape while passing the support plate 126.

Subsequently, in step S207, an OPP film 130 is attached to the junction part 113 unfolded from the film sheet 110 as illustrated in FIG. 4B. At this time the width of the OPP film 130 is same as the width W2 of the junction part.

Subsequently, in step S208, the film sheet 110, to which the OPP film 130 is attached, is wound about a bobbin R2 as illustrated in FIG. 5.

In a masking film according to a second exemplary embodiment of the present invention, which is manufactured by the method according the second exemplary embodiment of the present invention, a film sheet 110 folded into a plurality of leaves is slit into an outermost film 112 by a slitter 125 along a virtual slitting line 115 positioned by a predetermined width W2 inward from a folding line 111 formed when the film sheet 110 is lastly folded, a junction part 113 being slit is unfolded by a support plate 126 of a ladder shape, an OPP film strip 130 is attached to the unfolded junction part 113 and disposed between the slit piece 36 of the film sheet 110 and an adhesive tape 50, and the film sheet 110 with the OPP film 130 is wound about a bobbin R2.

Figure 6:
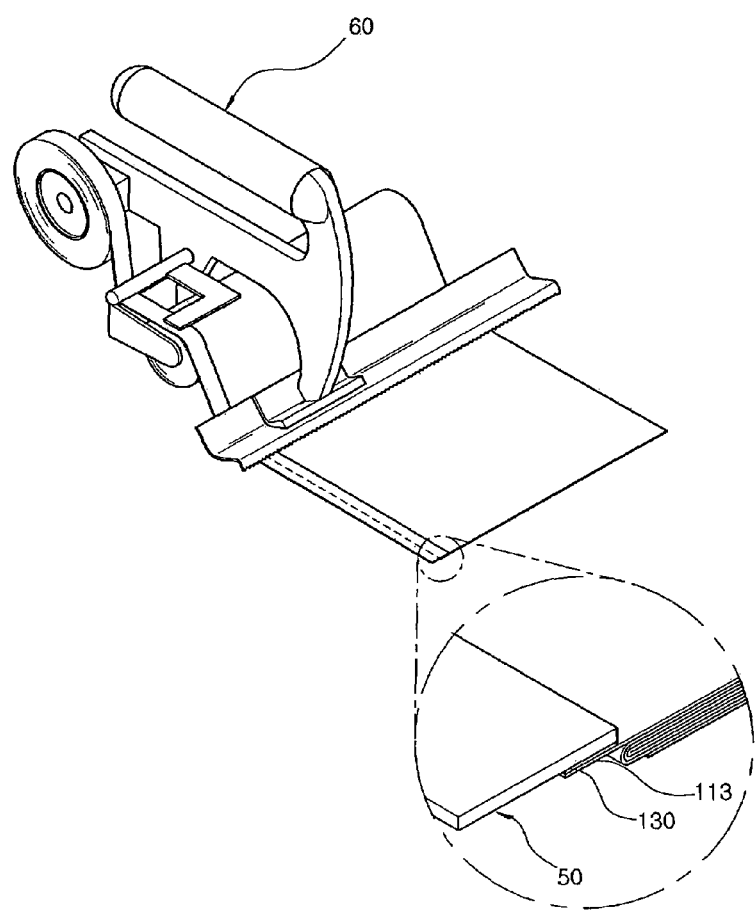
FIG. 6 is a perspective view and partially enlarged view illustrating an example that an adhesive tape is attached to a masking film manufactured by the method according to the second exemplary embodiment, using a dispenser.

With reference to FIG. 5, in the masking film according to the second exemplary embodiment of the present invention, the junction part 113 is firmly wound about the bobbin R2 by the OPP film 130, and the winding height of the junction part 113 is same as that of the film sheet 110 by the OPP film 130. Therefore, as illustrated in FIG. 6, when a worker attaches an adhesive tape 50 to the OPP film 130 by using a dispenser 60, the junction part 113 is not pressed so that the adhesive tape 50 is prevented from being deviated from the OPP film 130 and unintentionally adhered.

In the masking film manufactured by the method for manufacturing the same according to the exemplary embodiments of the present invention, the portion being unfolded to cover the area not to be painted is prevented from being adhered to the adhesive tape when the adhesive tape is attached to the slit piece (or the OPP film) by using the dispenser.

The invention has been described using preferred exemplary embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

What is claimed is:

1. A masking film comprising:
   a film sheet, extrusion-molded into a tube shape, compressed and folded into a plurality of leaves;
   a slit piece formed on the most outside film wherein the slit piece is slit along a virtual slitting line and positioned a predetermined width inward from a folding line formed where the film sheet is lastly folded; and
   an oriented polypropylene (OPP) film strip attached to the slit piece adjacent the slitting line and disposed between the slit piece of the film sheet and an adhesive tape wherein the adhesive tape is used to hold the slit piece of the film sheet at a boundary line between an area to be painted and an area not to be painted, when the film sheet is unfolded and positioned over the area not to be painted.

2. A masking film as recited in claim 1, wherein the width is within the range of 9 to 20 mm.

3. A masking film comprising:
   an outermost film of a film sheet folded into a plurality of leaves, and slit along a virtual slitting line positioned at a predetermined width inward from a folding line formed when the film sheet is lastly folded into the plurality of leaves;
   a junction part slit and unfolded by a support plate;
   a film strip attached to the unfolded junction part; and
   an adhesive tape holding the junction part of the film sheet at a boundary line between an area to be painted and an area not to be painted, when the film sheet is unfolded and positioned over the area not to be painted, wherein an oriented polypropylene (OPP) film strip is attached to the slit piece adjacent the slitting line and disposed between the slit piece and the adhesive tape.

4. A masking film as recited in claim 3 wherein the film strip is an Oriented polypropylene (OPP) film.

\* \* \* \* \*